(12) United States Patent
Nagao

(10) Patent No.: US 6,700,941 B1
(45) Date of Patent: Mar. 2, 2004

(54) DIGITAL DEMODULATION APPARATUS

(75) Inventor: Fumiaki Nagao, Gifu-ken (JP)

(73) Assignee: Sanyo Electric Co., Ltd., Osaka (JP)

(*) Notice: Subject to any disclaimer, the term of this patent is extended or adjusted under 35 U.S.C. 154(b) by 0 days.

(21) Appl. No.: 09/536,199

(22) Filed: Mar. 27, 2000

(30) Foreign Application Priority Data

Mar. 30, 1999 (JP) .......................................... 11-089259

(51) Int. Cl.[7] .............................. H03D 3/18; H03D 3/24

(52) U.S. Cl. ........................ 375/327; 375/373; 375/334

(58) Field of Search ................................ 375/376, 334, 375/373, 355, 327, 372; 349/69; 348/541, 731; 327/156, 147

(56) References Cited

U.S. PATENT DOCUMENTS 5,920,214 A * 7/1999 Lee et al. .................... 327/147

* cited by examiner

*Primary Examiner*—Stephen Chin
*Assistant Examiner*—Curtis Odom
(74) *Attorney, Agent, or Firm*—Fish & Richardson P.C.

(57) ABSTRACT

A digital demodulation apparatus for performing a stable oscillation operation has a simple circuit configuration. The digital demodulation apparatus includes a pulse width counter for measuring a cycle of a modulated signal to generate digital cycle information. A first digital filter equalizes the digital cycle information to generate averaged cycle information. A comparator compares the digital cycle information and the averaged cycle information to generate a bi-phase signal. A phase-locked loop generates a clock signal having a frequency according to the averaged cycle information and a phase being synchronized with the phase of the bi-phase signal.

7 Claims, 1 Drawing Sheet

DIGITAL DEMODULATION APPARATUS

BACKGROUND OF THE INVENTION

The present invention relates to a digital demodulation apparatus, and more particularly, to a digital demodulation apparatus for demodulating a frequency-modulated bi-phase signal.

FIG. 1 is a schematic block diagram of a digital demodulation circuit 100, and FIG. 2 is a chart showing the waveforms of signals handled by the demodulation circuit 100 of FIG. 1.

A bi-phase signal BS is inverted every predetermined r data period T and is either inverted or maintained during the predetermined period T to represent binary information. For example, with reference to FIG. 2, the binary information inverted at the middle of the data period T represents "1" and the binary information maintained in the same state during the data period T represents "0". Frequencies are switched in accordance with the shifting of the bi-phase signal BS between a high level and a low level to frequency-modulate the bi-phase signal BS. For example, if the frequency of a carrier wave is 20 kHz, a modulated signal MS that is 2 kHz higher is generated when the bi-phase signal BS is high, and 2 kHz lower when the bi-phase signal BS is low. In other words, the modulated signal MS includes a high frequency component, which has a high level and is higher than the carrier wave frequency, and a low frequency component, which has a low level and is lower than the carrier wave frequency. The two frequency components of the modulated signal MS are mixed in a time-dividing manner.

The demodulation circuit 100 includes a pulse width counter 1, a bandpass filter 2, a code determiner 3, and a phase-locked loop 4. The pulse width counter 1 measures the cycle of the modulated signal MS by performing a count operation based on a clock signal having a frequency that is significantly higher than the carrier frequency of the modulated signal MS to generate digital cycle information PW0. For example, by performing a count operation and by resetting the count value each time the modulated signal MS exceeds a predetermined threshold value, the cycle information PW0, the value of which is updated every cycle of the modulated signal MS, is generated.

The bandpass filter 2 eliminates high frequency components included in the cycle information PW0 due to noise and direct current components from the cycle information PW0 provided by the pulse width counter 1 to generate a cycle signal PW1, which includes a frequency component that is substantially the same as the carrier wave frequency of the modulated signal MS. That is, when noise is included in the modulated signal MS thereby temporarily offsetting its cycle, high frequency components, which should not be included in the modulated signal MS, are eliminated from the cycle information PW0 to prevent erroneous functioning. Further, direct current components are eliminated from the cycle information PW0 to generate the cycle signal PW1, which indicates changes in the carrier frequency.

The code determiner 3 determines whether the code of the cycle signal PW1 provided from the bandpass filter 2 is positive or negative and generates the bi-phase signal BS. The code of the cycle signal PW1 represents the difference between the frequency of the modulated signal MS and the carrier frequency. Accordingly, the code indicates whether the modulated signal MS is high or low.

The phase-locked loop 4 uses the bi-phase signal BS as a reference signal to generate a bi-phase clock signal BC having a cycle that is one half the data period T of the bi-phase signal BS. The bi-phase clock signal BC is used by a signal processing circuit connected to the demodulation circuit 100 to retrieve and determine the bi-phase signal BS. That is, the signal processing circuit retrieves the bi-phase signal BS in accordance with the rising of the bi-phase clock signal BC and determines the data based on changes in the bi-phase signal BS.

The bi-phase signal BS does not rise and fall according to a constant cycle. Thus, the phase-locked loop 4 performs phase comparison between a certain rising edge or falling edge of the bi-phase signal BS and an oscillation clock. In this case, the oscillation clock may be locked at an erroneous frequency since it may be determined that there is no phase difference between the oscillation clock and the bi-phase signal regardless of the cycle of the bi-phase signal BS being an integer times greater than that of the oscillation clock. Accordingly, in addition to phase comparison, it is required that PLL control be performed so that the frequency of the oscillation clock matches the frequency of the bi-phase signal BS. However, the frequency comparison process is more complicated than phase comparison. This complicates the circuit configuration and increases the circuit area of the phase-locked loop 4.

SUMMARY OF THE INVENTION

It is an object of the present invention to provide a digital demodulation apparatus that performs a stable oscillation operation and has a simple circuit configuration.

A first aspect of the present invention provides a digital demodulation apparatus. The digital demodulation apparatus includes a pulse width counter for measuring a cycle of a modulated signal to generate digital cycle information. A first digital filter is connected to the pulse width counter for equalizing the digital cycle information to generate averaged cycle information. A comparator is connected to the pulse width counter and the first digital filter for comparing the digital cycle information and the averaged cycle information to generate a bi-phase signal. A phase-locked loop generates a clock signal having a frequency according to the averaged cycle information and a phase being synchronized with the phase of the bi-phase signal.

A second aspect of the present invention provides a method for demodulating a bi-phase signal. First, a cycle of a modulated signal is measured to generate digital cycle information. The digital cycle information is equalized to generate averaged cycle information. Then, the digital cycle information and the averaged cycle information are compared to generate a bi-phase signal. A clock signal having a frequency according to the averaged cycle information and a phase being synchronized with the phase of the bi-phase signal is then generated.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENT

Figure 3:
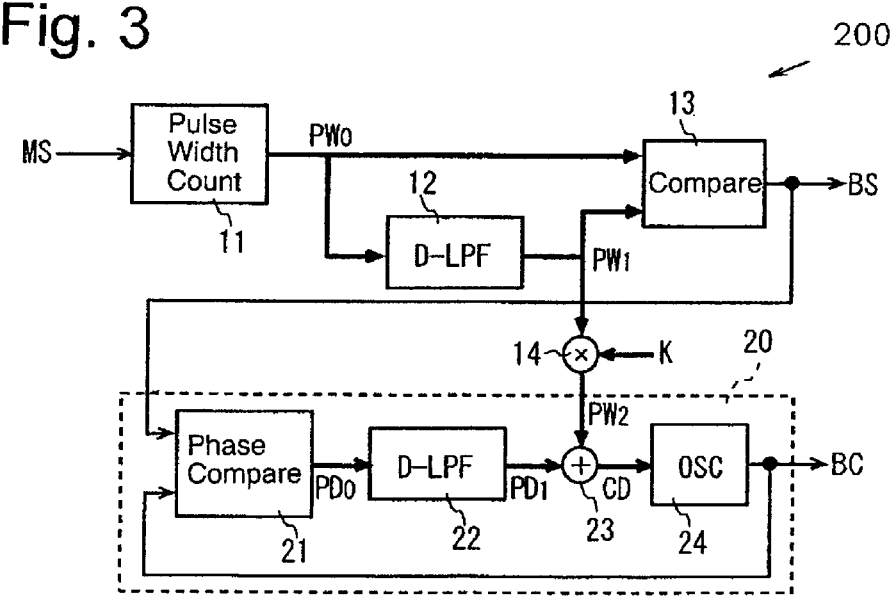
FIG. 3 is a schematic block diagram of a digital demodulation apparatus according to one embodiment of the present invention.

FIG. 3 is a schematic block diagram showing a digital demodulation circuit 200 according to one embodiment of the present invention. The demodulation circuit 200 demodulates a modulated signal MS and generates a bi-phase signal BS.

The demodulation circuit 200 includes a pulse width counter 11, a first digital low-pass filter 12, a comparator 13, a multiplier 14, and a digital phase-locked loop 20. The modulated signal MS includes two types of frequency components mixed in a time-dividing manner. That is, the modulated signal MS includes high frequency components, which have a high level and are higher than the carrier wave frequency, and low frequency components, which have a low level and are lower than the carrier wave frequency.

Figure 1:
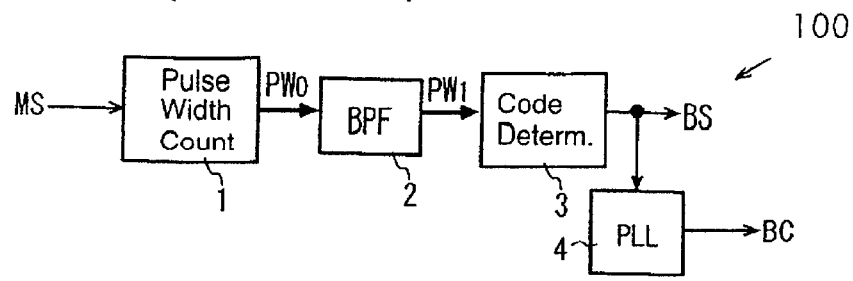
FIG. 1 is a schematic block diagram of a prior art digital demodulation apparatus.
Figure 2:
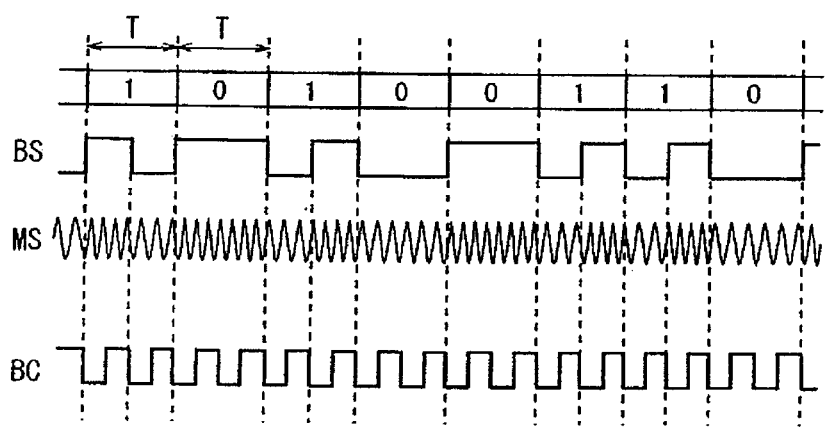
FIG. 2 is a chart showing the waveforms of a bi-phase signal, a modulated signal, and a bi-phase clock signal.

The pulse width counter 11 generates cycle information PW0 by performing a count operation based on a high frequency clock signal to measure the cycle of the modulated signal MS and generate cycle information PW0. The pulse width counter 11 generates the cycle information PW0, the value of which is updated every cycle of the modulated signal MS, in the same manner as the pulse width counter 1 of FIG. 1.

The first digital low-pass filter 12 performs a filtering computation process on the cycle information PW0 provided from the pulse width counter 11 to equalize the cycle information PW0 and generate averaged cycle information PW1. For example, the first digital low-pass filter 12 successively receives the cycle information PW0 corresponding to at least one cycle of the bi-phase signal and computes the average value of the cycle information PW0 to obtain the averaged cycle information PW1.

The comparator 13 compares the cycle information PW0 and the averaged cycle information PW1 to generate the bi-phase signal BS, which is shifted between a high level and a low level in accordance with the comparison result. That is, the averaged cycle information PW1 basically represents a carrier wave frequency of the modulated signal MS, and the cycle information PW0 represents a frequency that is caused to be higher or lower than the carrier wave frequency due to modulation. Thus, the averaged cycle information PW1 and the cycle information PW0 are compared to detect the changing of the frequency of the modulated signal MS. The frequency of the modulated signal MS is changed in accordance with the inversion timing of the bi-phase signal BS. Thus, the bi-phase signal BS is reproduced using the comparison result of the comparator 13.

The multiplier 14 receives the averaged cycle information PW1 from the first digital low-pass filter 12, multiplies the averaged cycle information PW1 by a predetermined coefficient k, and generates oscillation cycle information PW2 in accordance with the digital phase-locked loop 20. Normally, the carrier wave frequency of the modulated signal MS is higher than the frequency (oscillation frequency) of the bi-phase clock signal BC generated by the phase-locked loop 20. Thus, the difference between the carrier wave frequency and the oscillation frequency is compensated for by the multiplication with the coefficient k. For example, if the carrier wave frequency of the modulated signal MS is 20 kHz and the frequency of the bi-phase clock signal BC is 8 kHz, the averaged cycle information PW1 is multiplied by k (20/8=2.5) to generate the oscillation cycle information PW2.

The digital phase-locked loop 20 includes a phase comparator 21, a second digital low-pass filter 22, an adder 23, and a numerical-controlled oscillator 24. The phase-locked loop 20 performs an oscillation operation in accordance with the oscillation cycle information PW2 to generate the bi-phase clock signal BC so that the phase of the bi-phase signal BS matches the phase of the oscillation clock.

The phase comparator 21 compares the phase of the bi-phase signal BS and the phase of the bi-phase clock signal BC, which is provided by the numerical-controlled oscillator 24, to generate phase difference information PD0, which numerically represents the phase difference.

The second digital low-pass filter 22 equalizes the phase difference information PD0 by performing a filtering computation process on the phase difference information PD0, which is provided by the phase comparator 21, to generate average phase information PD1. For example, the second digital low-pass filter 22 successively receives the phase difference information PD0 for a certain period and computes the average value of the successive phase difference information to generate the average phase difference information PD1.

The adder 23 adds the average phase information PD1, which is provided by the second digital low-pass filter 22, and the oscillation cycle information PW2, which is provided by the multiplier 14, to generate control information CD.

The numerical-controlled oscillator 24 generates an oscillation clock signal, which has a frequency that changes in accordance with the control information CD provided by the adder 23, as the bi-phase clock signal BC. The control information CD includes the oscillation-cycle information PW2 and the average phase difference information PD1. Thus, the numerical-controlled oscillator 24 performs an oscillation operation at a frequency determined by the oscillation cycle information PW2, while synchronizing the phase of the bi-phase clock signal BC with the phase of the bi-phase signal BS in accordance with the average phase difference information PD1. Accordingly, the bi-phase clock signal BC output from the phase-locked loop 20 has a cycle that is a predetermined number times greater than the carrier frequency of the modulated signal MS and has a phase matching the phase of the bi-phase signal BS.

In the above digital demodulation circuit 200, the oscillation cycle information PW2 is generated based on the carrier wave frequency of the modulated signal MS, and the By oscillation frequency of the phase-locked loop 20 is controlled in accordance with the oscillation cycle information PW2. Accordingly, the phase-locked loop 20 is not required to perform frequency comparison. As a result, the phase-locked loop 20 maintains a stable oscillation operation and has a simple circuit configuration. Further, if the carrier wave frequency of the modulated signal changes, the oscillation operation of the phase-locked loop can easily follow the change.

Although only one embodiment of the present invention has been described herein, it should be apparent to those skilled in the art that the present invention may be embodied in many other specific forms without departing from the spirit or scope of the invention. Therefore, the present examples and embodiments are to be considered as illustrative and not restrictive. The present invention is not to be limited to the details given herein, but may be modified within the scope and equivalence of the appended claims.

What is claimed is:

1. A digital demodulation apparatus comprising:
    a pulse width counter for measuring a cycle of a modulated signal to generate digital cycle information;
    a first digital filter connected to the pulse width counter for equalizing the digital cycle information to generate averaged cycle information;
    a comparator connected to the pulse width counter and the first digital filter for comparing the digital cycle information and the averaged cycle information to generate a bi-phase signal; and
    a phase-locked loop for receiving the bi-phase signal and the averaged cycle information and generating a clock signal having a frequency according to the averaged cycle information and a phase being synchronized with the phase of the bi-phase signal.

2. A digital demodulation apparatus comprising:
    a pulse width counter for measuring a cycle of a modulated signal to generate digital cycle information;
    a first digital filter connected to the pulse width counter for equalizing the digital cycle information to generate averaged cycle information;
    a comparator connected to the pulse width counter and the first digital filter for comparing the digital cycle information and the averaged cycle information to generate a bi-phase signal; and
    a phase-locked loop generating a clock signal having a frequency according to the averaged cycle information and a phase being synchronized with the phase of the bi-phase signal, wherein the phase-locked loop includes:
        a phase comparator for comparing a phase of the bi-phase signal with a phase of an oscillation clock signal to generate phase difference information;
        a second digital filter connected to the phase comparator for equalizing the phase difference information to generate average phase difference information;
        an adder connected to the second digital filter for adding the averaged cycle information from the first digital filter to the average phase difference information to generate control information; and
        an oscillator connected to the adder for generating the oscillation clock signal having a frequency according to the control information and providing the oscillation clock signal to the phase comparator.

3. The digital demodulation apparatus according to claim 2, further comprising a second adder connected between the first digital filter and the adder for multiplying the averaged cycle information by a predetermined coefficient to generate coefficient-multiplied averaged cycle information.

4. The digital demodulation apparatus according to claim 2, wherein the oscillator includes a numerical-controlled oscillator.

5. A method for demodulating a bi-phase signal, comprising the steps of:
    measuring a cycle of a modulated signal to generate digital cycle information;
    equalizing the digital cycle information to generate averaged cycle information;
    comparing the digital cycle information and the averaged cycle information to generate a bi-phase signal; and
    a phase-locked loop receiving the bi-phase signal and the averaged cycle information,
    the phase-locked loop generating a clock signal having a frequency according to the averaged cycle information and a phase being synchronized with the phase of the bi-phase signal.

6. A method for demodulating a bi-phase signal, comprising the steps of:
    measuring a cycle of a modulated signal to generate digital cycle information;
    equalizing the digital cycle information to generate averaged cycle information;
    comparing the digital cycle information and the averaged cycle information to generate a bi-phase signal; and
    generating a clock signal having a frequency according to the averaged cycle information and a phase being synchronized with the phase of the bi-phase signal, wherein the clock signal generating step includes the steps of:
        comparing a phase of the bi-phase signal with a phase of an oscillation clock signal to generate phase difference information;
        equalizing the phase difference information to generate average phase difference information;
        adding the averaged cycle information to the average phase difference information to generate control information; and
        generating the oscillation clock signal having a frequency according to the control information.

7. The method according to claim 6, further comprising the step of multiplying the averaged cycle information by a predetermined coefficient to generate coefficient-multiplied averaged cycle information.

* * * * *